This invention relates to rotary plug valves, and, more particularly, to a gas meter stop which, when turned to shut off the flow of gas therethrough, automatically remains in a closed position and cannot be moved to an open position without a special tool.

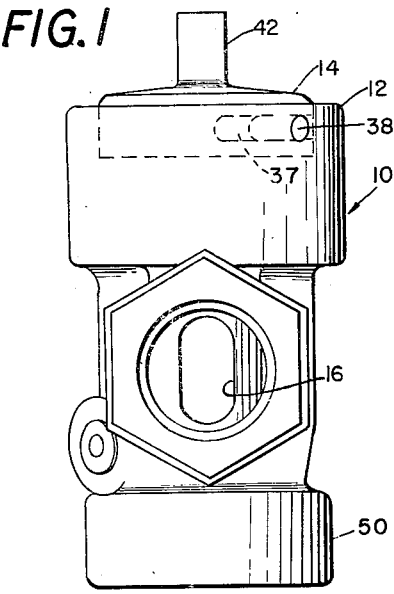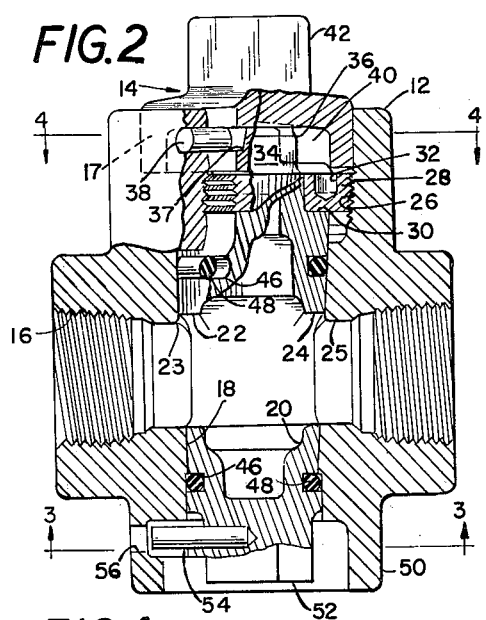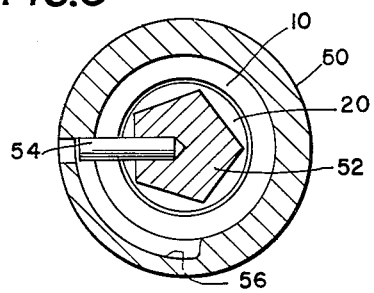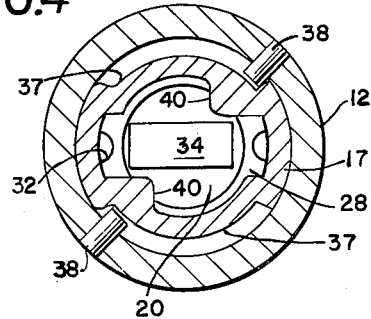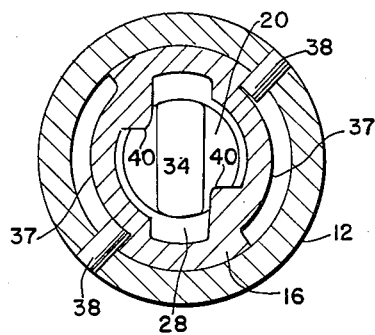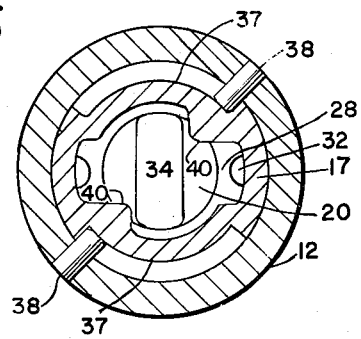
INVENTOR
WILBUR R. LEOPOLD, JR.
JOHN J. SMITH
BY Cushman, Darby & Cushman
ATTORNEYS 2,994,341
ROTARY PLUG VALVE
Wilbur R. Leopold, Jr. and John J. Smith, Decatur, Ill., assignors to Mueller Co., Decatur, Ill., a corporation of Illinois
Filed Feb. 3, 1960, Ser. No. 6,398
9 Claims. (Cl. 137—382)

It frequently occurs that a householder will attempt to repair or adjust a gas-burning appliance in his own home and, before so doing, turns off the gas for the entire house. The valve controlling the supply of gas to a dwelling usually is known as a meter stop because ordinarily it is connected into the gas supply line immediately in front of the gas meter. After the repairs or adjustments have been made, the householder then usually turns on the gas by opening the meter stop. There have been actual instances, however, where the householder, after turning on the gas, has forgotten to relight the pilot lights of appliances other than the one on which he was working, with a consequent small leakage of gas into the dwelling from the unlit pilots. As a result of such gas leakage, explosions actually have occurred, with disastrous results.

Accordingly, it is an object of this invention to provide a gas meter stop which, when shut off, will automatically remain in its shut-off position and cannot again be reopened without the use of a special tool.

It is another object of this invention to provide a gas meter stop having a lost-motion connection between a closure and operating cap and the valve plug wherein rotation of the cap in one direction turns the plug, but a subsequent rotation of the cap in any direction will not affect the plug.

These and further objects and advantages will become readily apparent to those skilled in the art upon reading the following detailed description taken in conjunction with the appended drawings in which:

FIGURE 1 is an end view in elevation of a rotary plug valve embodying this invention;

FIGURE 2 is a side elevational view, partly in vertical section and with parts broken away, of the valve shown in FIGURE 1, taken from the right-hand side of the latter figure and showing the valve in its open position;

FIGURE 3 is a cross-sectional view taken along line 3—3 of FIGURE 2;

FIGURE 4 is a cross-sectional view taken along line 4—4 in FIGURE 2;

FIGURE 5 is a view corresponding to FIGURE 4 but showing the parts in their respective positions immediately after closing the valve; and FIGURE 6 is a view corresponding to FIGURE 5 but showing the operating cap rotated 90° in a reverse direction.

Referring now to the drawing, there is shown a tapered rotary plug valve having a tapered circular casing or body 10 having a skirt or annular extension 12 at its larger end in which is rotatably mounted a cap-like closure member 14. The casing 10 has a flowaway 16 which is intersected by a circular tapered valve seat 18. A tapered valve plug 20 having ports 22 and 24 is rotatably mounted in the valve seat 18 so that the plug ports 22 and 24 may be rotated into and out of alignment with the casing or seat ports 23 and 25 to open and close the valve. The annular extension 12 is interiorly threaded at its inner end at 26 to receive an exteriorly threaded plug-retaining gland or annular collar 28 which seats against an outwardly facing annular shoulder 30 on the larger end of the plug 20. The collar 28 preferably is provided with spaced recesses 32 in its upper surface to receive a suitable turning tool (not shown). The collar 28 permits free rotation of the plug 20 but prevents any undesired axial movement thereof.

Outwardly beyond the collar 28 the larger end of the plug 20 is provided with a transverse flat projection or lug 34 corresponding to the usual wrench-engageable extension of ordinary plug valves. The closure member 14 has a depending skirt 17 defining a recessed portion 36 in the closure underside which surrounds the lug 34. The closure skirt 17 has arcuate peripheral grooves 37 of limited extent in opposite sides of its exterior surface to receive the inner ends of radially inwardly directed pins 38 carried by the casing extension 12. The pins 38 and grooves 37 are preferably disposed at diagonally opposite sides of the casing extension 12 and closure 14 respectively to limit the amount of rotation of the closure to 90°, and also to effectively preclude removal of the closure from within the casing extension. The interior or recessed portion 36 of the closure 14 has radially inwardly extending projections or lugs 40 that have a 90° lost-motion engagement with the transverse extension 34 on the larger end of the plug 20. This arrangement is such that the lugs 40 engage diagonally opposite corners of the plug extension 34 when the valve is closed, as shown best in FIGURE 4.

The outer end of the closure 14 is provided with an outwardly extending non-circular projection 42 which is engageable by a suitable wrench or tool (not shown) to turn the valve plug 20. Upon rotation of the closure 14, clockwise as shown in FIGURE 4, to close the valve, the lugs 40 in engagement with diagonally opposite corners of the plug extension 34, push against it to cause it to turn with the closure to the extent of rotation permissible by the pin 38 and groove 37 (FIGURES 4 and 5) arrangement described above. The 90° rotation of the closure 14 and plug 20 is sufficient to move the plug ports 22 and 24 out of alignment with the seat ports 23 and 25 to close the valve. A subsequent counter-rotation of the closure 14, however, does not effect or cause rotation of the plug 20 because the lugs 40 of the closure move away from their corresponding corners of the plug extension 34, as shown in FIGURE 6. A subsequent rotation of closure 14 in the direction to close the valve will also have no effect on the plug position as the lugs 40 and plug extension 34 are not in engagement.

The plug 20 is, like the closure 14, limited to 90° rotation within the valve seat 18, and also may have exterior circumferential grooves 46 above and below its ports 22 and 24 to receive sealing O-rings 48 to provide a completely fluid-tight seal with the casing 10. The casing 10 has an annular extension or skirt 50 at its smaller end which surrounds a smaller end extension 52 of plug 20. A radially outwardly facing pin 54 is carried by the extension 52 and is adapted to ride along an interior arcuate groove 56 of limited extent in casing extension 50. The end extension 52 is preferably pentagonal in cross section so that the ordinary tool available to the average homeowner cannot effectively engage the exposed end of the plug. In this regard a special turning tool (not shown) adapted to fit the extension 52 may be retained by the gas company so that the valve, when once closed, may be opened only by the utility company. This will insure that the gas in the home will be properly turned on and all pilot lights lighted. In the valve of this invention, the only way the plug 20 may be returned to its original position, once it has been rotated by the closure 14, is by turning the plug at its lower end by engaging the pentagonal extension 52 by a proper tool.

The pin 54 and groove 56 are arranged to limit the rotation of the plug 20 between an open and closed position to one 90° sector and prevent the plug from being rotated a full 360° within the casing 10. This arrangement insures that once the plug has been rotated by the closure 14 in the direction to close the valve, the latter can be opened only by rotating the plug in the opposite direction. Therefore, when the plug 20 is rotated to its open position the extension 34 is once again in engagement with the lugs 40 on the closure 14 and may be reclosed by rotating the closure 14 as described above. The pin 54 additionally functions as a secondary check and plug retaining safety device.

It will thus be seen that there has been provided by this invention a device in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

We claim:

1. A rotary plug valve comprising: a casing having a flow-way intersected by a valve seat; a valve plug rotatably mounted in said seat to open and close the valve; means associated with said casing and plug to limit rotation of the latter to movements between valve open and valve closed positions; an annular extension on one end of said casing surrounding a corresponding end of said plug; a closure mounted to said extension for rotary movement coaxial with said plug; means securing said closure against removal from said extension; a rotary lost-motion connection between said closure and said plug end, the extent of lost-motion in said connection being substantially equal to said limited movement of said plug; and means associated with said casing and closure to limit rotation of the latter to movement between a position wherein said lost-motion is taken up and said plug is in said valve open position and a position wherein said lost-motion is taken up and said valve is in said valve closed position, whereby said valve can be closed by rotation of said closure but reverse rotation of said closure will not open said valve when the latter is closed.

2. The structure defined in claim 1 in which the closure includes a depending annular extension telescopingly related to the annular casing extension, and the means for securing said closure against removal and the means for limiting rotation of said closure includes a pin extending through one of said extensions into a groove of limited arcuate extent in the other of said extensions.

3. The structure defined in claim 2 in which the casing has an annular extension on its other end surrounding an extension on the corresponding other end of the valve plug with said latter plug extension being confined completely within said last-mentioned annular casing extension and adapted to be engaged only by a special plug-turning wrench.

4. The structure defined in claim 3 including means within the annular extension on the one casing end to engage and retain the plug in the seat.

5. A rotary plug valve comprising: a casing having a flow-way intersected by a tapered valve seat; a tapered valve plug rotatably mounted in said seat to open and close the valve; means associated with said casing and plug to limit rotation of the latter to movement between valve open and valve closed positions; an annular extension on one end of said casing surrounding the corresponding end of said plug; a closure mounted to said extension for rotary movement coaxial with said plug; means securing said closure against removal; a rotary lost-motion connection between said closure and said plug end, the extent of lost-motion in said connection being substantially equal to said limited movement of said plug; and means associated with said casing and closure to limit rotation of the latter to movement between a position wherein said lost-motion is taken up and said plug is in said valve open position and a position wherein said lost-motion is taken up and said plug in said valve closed position; an annular extension on the other end of said casing; and an extension on the other end of said valve plug completely confined within said last-mentioned annular casing extension and adapted to be engaged only by a special plug-turning wrench.

6. The structure defined in claim 5 in which the extension on the one end of the casing is at the larger end of the seat and is interiorly threaded at its inner end, and including an exteriorly threaded collar engaged within said extension and with a shoulder on said plug to retain the latter in said seat.

7. The structure defined in claim 5 in which the closure has a depending annular extension telescopingly related to the corresponding casing extension, and the means for securing said closure against removal and the means for limiting movement of said closure includes a pin extending through one of said extensions into a groove of limited arcuate extent in the other of said extensions.

8. The structure defined in claim 5 in which the means for limiting rotation of the plug includes a pin extending radially from one of the extensions on the other end of the plug and casing into a groove of limited arcuate extent in the other of said extensions.

9. The structure defined in claim 8 in which the pin extends radially outwardly from the plug extension into a groove in the surrounding casing extension.

No references cited.